US012620060B2

(12) United States Patent (10) Patent No.: US 12,620,060 B2
Arakawa (45) Date of Patent: May 5, 2026

(54) IMAGE PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Ryoji Arakawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 18/316,519

(22) Filed: May 12, 2023

(65) Prior Publication Data

US 2023/0386000 A1 Nov. 30, 2023

(30) Foreign Application Priority Data

May 31, 2022 (JP) ................................. 2022-088874

(51) Int. Cl.
| | |
|---|---|
| *G06T 5/50* | (2006.01) |
| *G06T 5/70* | (2024.01) |
| *H04N 23/81* | (2023.01) |

(52) U.S. Cl.
CPC .................. *G06T 5/50* (2013.01); *G06T 5/70* (2024.01); *H04N 23/81* (2023.01); *G06T 2207/10144* (2013.01); *G06T 2207/20208* (2013.01)

(58) Field of Classification Search
CPC ... G06T 5/50; G06T 5/70; G06T 2207/10144; G06T 2207/20208; G06T 5/92;
(Continued)

(56) References Cited

U.S. PATENT DOCUMENTS

| 8,836,850 B2 | 9/2014 | Kaida |
|---|---|---|
| 9,460,532 B2 | 10/2016 | Yamaguchi |

(Continued)

FOREIGN PATENT DOCUMENTS

| JP | 2006-003740 A | 1/2006 |
|---|---|---|
| JP | 2010-124412 A | 6/2010 |

(Continued)

OTHER PUBLICATIONS

Aug. 31, 2023 European Official Action in European Patent Appln. No. 23171241.5.

(Continued)

*Primary Examiner* — Phuoc Tran
(74) *Attorney, Agent, or Firm* — Venable LLP

(57) ABSTRACT

The present invention provides an image processing apparatus operable to process first and second image data from an image capturing unit capable of amplifying, with different gains, a signal obtained by photoelectric conversion and outputting the first and second image data, wherein the apparatus comprises an acquiring unit configured to acquire an exposure difference between the first and second image data; a correcting unit configured to determine a correction amount for reducing a noise difference between the first and second image data based on the exposure difference acquired by the acquiring unit and correct at least one of the first and second image data based on the determined correction amount; and a generating unit configured to generate a composite image by compositing the first and second image data, at least one of which has been corrected by the correcting unit.

9 Claims, 6 Drawing Sheets

(58) Field of Classification Search
CPC ........ H04N 23/81; H04N 23/70; H04N 23/71;
H04N 23/741; H04N 23/76; H04N 23/73
See application file for complete search history.

(56) References Cited

U.S. PATENT DOCUMENTS

| | | | |
|---|---|---|---|
| 9,706,131 | B2 | 7/2017 | Kobayashi |
| 10,043,253 | B2 | 8/2018 | Kimura |
| 11,133,339 | B2 | 9/2021 | Yamashita |
| 11,165,978 | B2 | 11/2021 | Kobuse |
| 11,184,565 | B2 | 11/2021 | Kobuse |
| 11,515,344 | B2 | 11/2022 | Yamashita |
| 2005/0288882 | A1* | 12/2005 | Pavkovich ........... G01D 18/008 |
| | | | 702/88 |
| 2013/0235257 | A1 | 9/2013 | Kaida |
| 2014/0044366 | A1 | 2/2014 | Yamaguchi |
| 2015/0358552 | A1 | 12/2015 | Kobayashi |
| 2016/0371823 | A1 | 12/2016 | Kimura |
| 2019/0319056 | A1 | 10/2019 | Yamashita |
| 2020/0336683 | A1* | 10/2020 | Kobuse .................. H04N 25/78 |
| 2021/0218911 | A1 | 7/2021 | Nakamura |
| 2021/0366959 | A1 | 11/2021 | Yamashita |
| 2022/0198625 | A1* | 6/2022 | McElvain ................. G06T 5/70 |
| 2023/0059164 | A1 | 2/2023 | Yamashita |
| 2023/0131477 | A1* | 4/2023 | Sato ..................... G06V 10/993 |
| | | | 345/629 |

FOREIGN PATENT DOCUMENTS

| | | | |
|---|---|---|---|
| JP | 2013-187681 | A | 9/2013 |
| JP | 2014-036401 | A | 2/2014 |
| JP | 2015-231118 | A | 12/2015 |
| JP | 2017-011327 | A | 1/2017 |
| JP | 2019-186910 | A | 10/2019 |
| JP | 2020-178186 | A | 10/2020 |
| JP | 2021-106375 | A | 7/2021 |

OTHER PUBLICATIONS

Mar. 7, 2024 Indian Official Action in Indian Patent Appln. No. 202344035656.
Mar. 30, 2026 Japanese Official Action in Japanese Patent Appln. No. 2022-088874.

* cited by examiner

F I G. 2
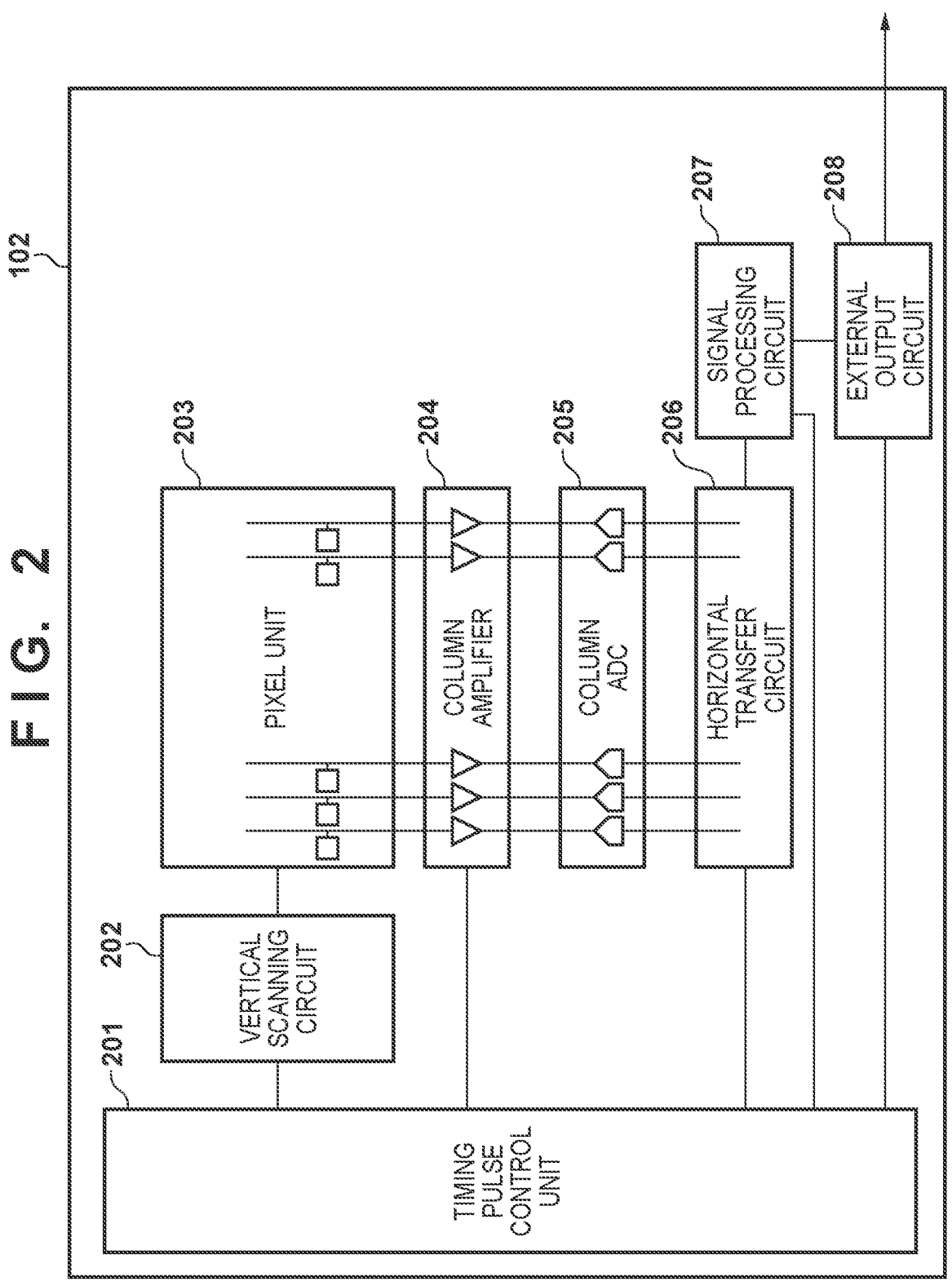

F I G.  4A
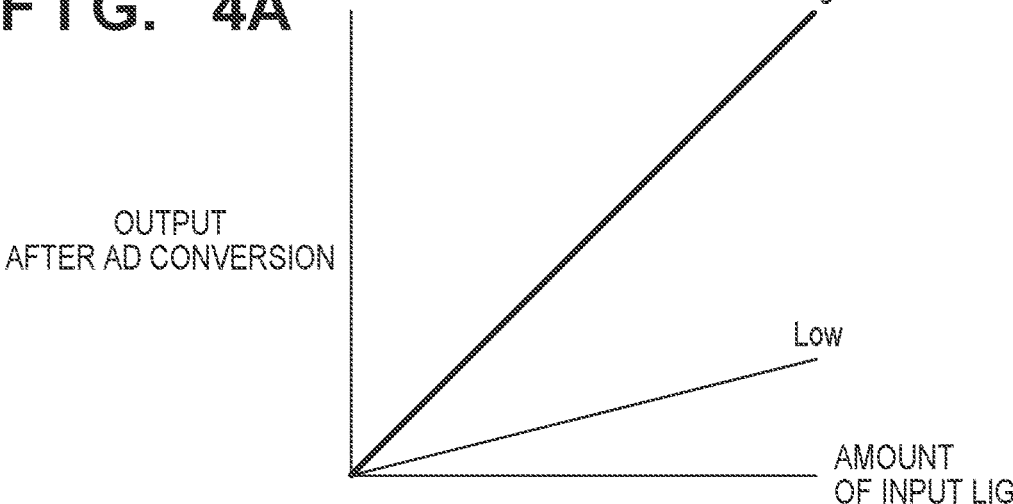
OUTPUT
AFTER AD CONVERSION
High
Low
AMOUNT
OF INPUT LIGHT
F I G.  4B
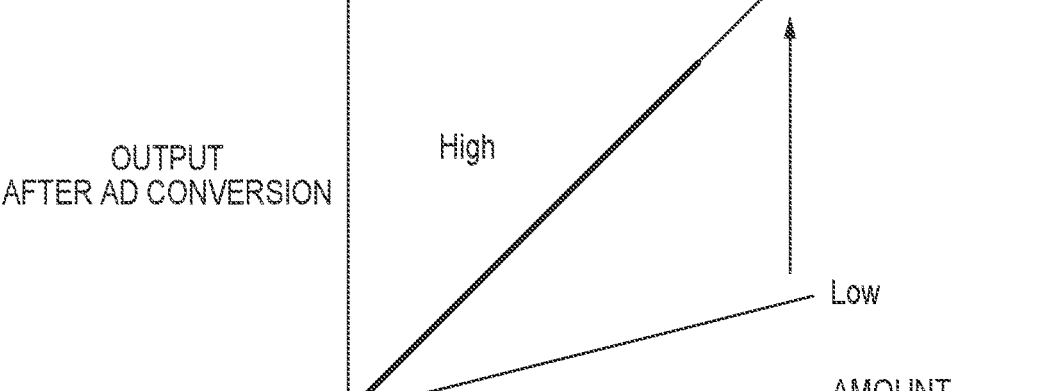
OUTPUT
AFTER AD CONVERSION
Low2
High
Low
AMOUNT
OF INPUT LIGHT
F I G.  4C
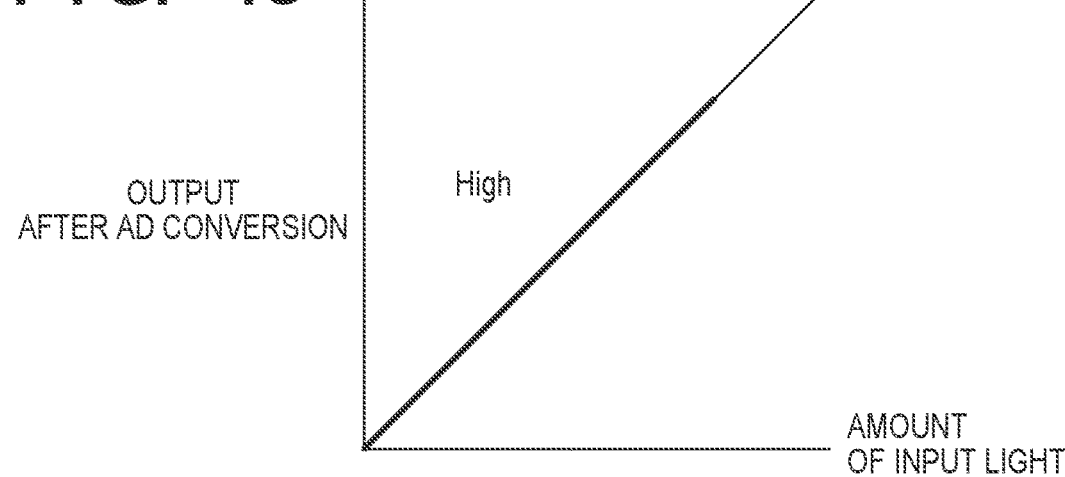
OUTPUT
AFTER AD CONVERSION
Low2
High
AMOUNT
OF INPUT LIGHT

F I G. 5

| | EXPOSURE DIFFERENCE | GAIN SHIFT AMOUNT |
|---|---|---|
| ISO SWING | −3EV | +4 LEVELS |
| ISO SWING | −2EV | +3 LEVELS |
| ISO SWING | −1EV | +2 LEVELS |
| Tv SWING | −3EV | +6 LEVELS |
| Tv SWING | −2EV | +5 LEVELS |
| Tv SWING | −1EV | +4 LEVELS |

IMAGE PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image processing apparatus, a control method thereof, and a non-transitory computer-readable storage medium

Description of the Related Art

Conventionally, a technique for high dynamic range compositing processing for compositing a plurality of images captured with different exposure amounts is known. According to this technique, it is possible to obtain an image without overexposure or underexposure by joining appropriate exposure signals of each image. Weighted addition ratios for use when compositing a plurality of images of different exposures are often determined based on luminance values. For example, 100% of an underexposed image without overexposure is used for a bright portion, 100% of an overexposed image without underexposure is used for a dark portion, and 100% of an appropriate image is used for portions near an appropriate exposure in a central portion of luminance. In an intermediate region of a range between a dark portion and an appropriately exposed portion, a usage ratio between an overexposed image and an appropriate image are determined and the images are composited. It is similar for an intermediate region of a range and the like between an appropriately exposed portion and a bright portion. A mix table in which a usage ratio for each image is thus defined for each brightness is held in advance, and the images are composited using the table.

In recent years, with improvement in sensor performance and the like, an image capturing device (Dual Gain Output (DGO)) including two column circuits for an output signal from a unit pixel, separately holding gains of amplifiers in the column circuits, and capable of outputting images of different gains has been used. The image capturing device can output two images of different gains (high gain and low gain images) with a single exposure. Compositing two images according to DGO has advantages, such as processing for aligning the two images being unnecessary and good compositing being possible for a moving subject. Accordingly, DGO is well suited to high dynamic range (HDR) compositing for obtaining an image with an expanded dynamic range.

An image capturing device includes floating diffusions (FDs), each serving a role of a capacitor for storing electric charge. The FD changes in capacitance for electric charge that it can hold depending on the setting. When the capacitance is increased, the FD can handle more light, and so, at low sensitivity, the FD is used with an increased capacitance. However, when the capacitance is increased, noise increases, and the effect of the noise appears in a composite image. In response to this, Japanese Patent Laid-Open No. 2010-124412 discloses a method in which when compositing RAW image data, noise is reduced according to an ISO sensitivity and compositing ratios of the images.

However, in the prior art disclosed in the aforementioned document, compositing coefficients are outputted based on the ratios at which the images are used when compositing. That is, the document basically targets images of different sensitivities but of the same exposure and does not mention anything about reducing noise occurring when compositing images of different brightnesses.

With the above advantages, compositing according to DGO allows known image processing to be performed by compositing RAW images; however, in a case of exposure according to DGO, when a high gain image and a low gain image are generated, noise is present due to an exposure difference and the noise worsens as the exposure difference increases; therefore, the effect of the noise appears in image compositing.

SUMMARY OF THE INVENTION

The present invention has been made in view of such problems and provides a technique for high dynamic range compositing processing in which noise is reduced in image compositing for when exposure is largely different.

The present invention in its first aspect provides an image processing apparatus operable to process first and second image data from an image capturing unit capable of amplifying, with different gains, a signal obtained by photoelectric conversion and outputting the first and second image data, the apparatus comprising: a processor; and a memory storing instructions which, when read and executed by a computer, cause the computer to function as: an acquiring unit configured to acquire an exposure difference between the first and second image data; a correcting unit configured to determine a correction amount for reducing a noise difference between the first and second image data based on the exposure difference acquired by the acquiring unit and correct at least one of the first and second image data based on the determined correction amount; and a generating unit configured to generate a composite image by compositing the first and second image data, at least one of which has been corrected by the correcting unit.

The present invention in its second aspect provides a control method of an image processing apparatus operable to process first and second image data from an image capturing unit capable of amplifying, with different gains, a signal obtained by photoelectric conversion and outputting the first and second image data, the method comprising: acquiring an exposure difference between the first and second image data; determining a correction amount for reducing a noise difference between the first and second image data based on the exposure difference acquired in the acquiring and correcting at least one of the first and second image data based on the determined correction amount; and generating a composite image by compositing the first and second image data, at least one of which has been corrected in the correcting.

The present invention in its third aspect provides a non-transitory computer-readable storage medium storing instructions which, when read and executed by a computer, causes the computer to execute steps of a method of controlling an image processing apparatus operable to process first and second image data from an image capturing unit capable of amplifying, with different gains, a signal obtained by photoelectric conversion and outputting the first and second image data, the method comprising: acquiring an exposure difference between the first and second image data; determining a correction amount for reducing a noise difference between the first and second image data based on the exposure difference acquired in the acquiring and correcting at least one of the first and second image data based on the determined correction amount; and generating a composite image by compositing the first and second image data, at least one of which has been corrected in the correcting.

According to the present invention, it is possible to generate, from two images having an exposure difference, a composite image in which a noise amount is reduced.

Further features of the present invention will become apparent from the following description of exemplary embodiments with reference to the attached drawings.

BRIEF DESCRIPTION OF THE DRAWINGS

FIG. 2 is a block diagram illustrating an internal structure of a solid-state image capturing device.

FIGS. 4A to 4C illustrate relationships between an amount of input light and an output code after AD conversion in the first embodiment.

FIG. 5 is a diagram illustrating an example of a table in which a relationship with a noise correction amount according to an exposure difference is defined.

DESCRIPTION OF THE EMBODIMENTS

Figure 1:
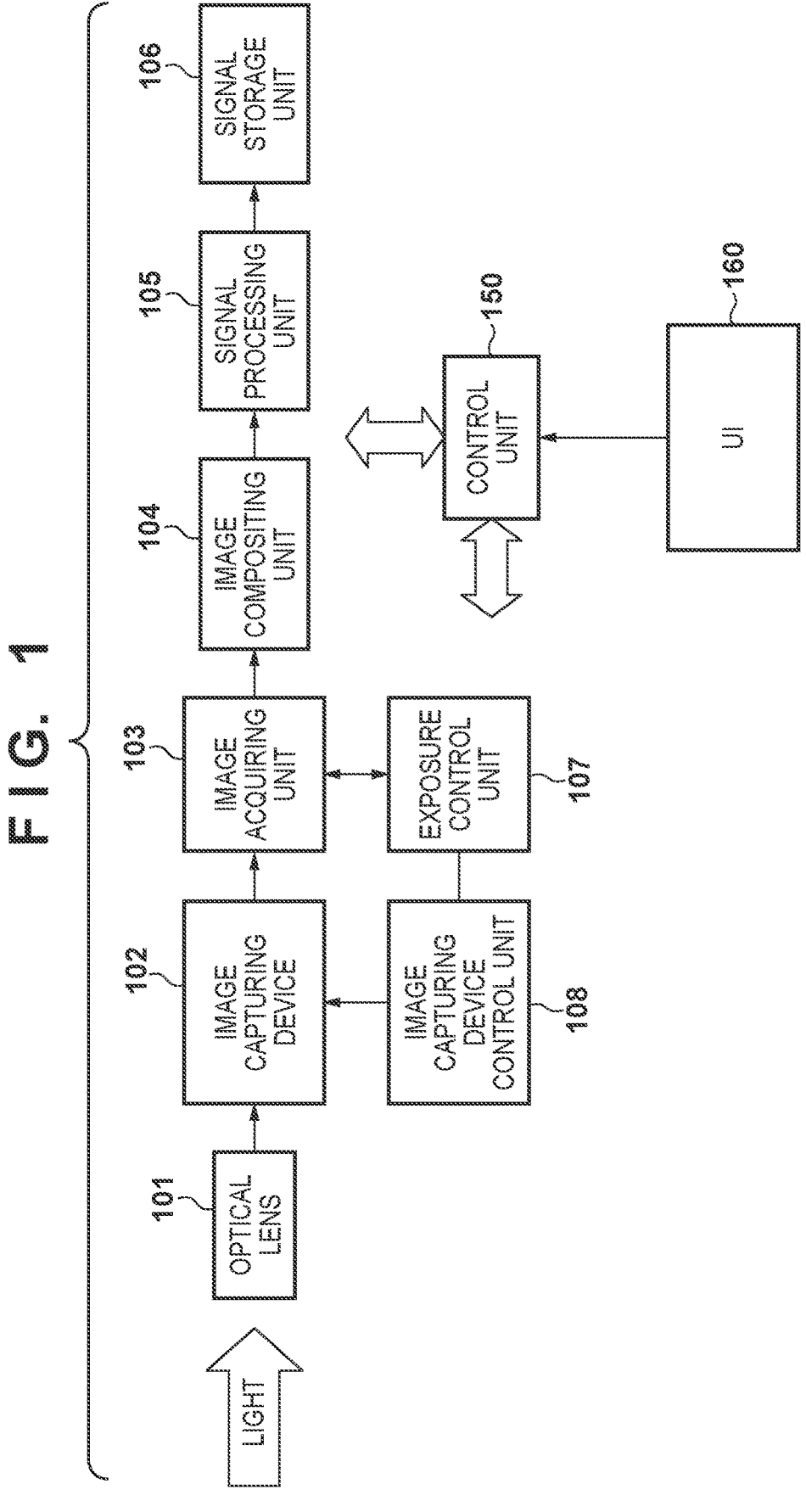
FIG. 1 is a block diagram of an image capturing apparatus of an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram for when an image processing apparatus in a first embodiment is applied to an image capturing apparatus typified by a digital camera or the like.

The image capturing apparatus includes an optical lens 101, an image capturing device 102, an image acquiring unit 103, an image compositing unit 104, a signal processing unit 105, an exposure control unit 107, an image capturing device control unit 108, a control unit 150, and a UI 160. The control unit 150 is responsible for controlling the entire apparatus and is configured by a processor, a ROM for storing programs to be executed by the processor and various parameters, and a RAM to be used as a working area. The UI 160 is configured by various buttons and keys typified by a shutter button, a display unit, and a touch panel provided in front of the display unit and functions as a user interface between a user and the image capturing apparatus.

The optical lens 101 captures light of a subject and forms an image of the subject on an image capturing surface of the image capturing device 102. The image capturing device 102 converts the optical image formed on the image capturing surface into electric signals and outputs the electric signals. Typical examples include a charge coupled device (CCD) image sensor, a CMOS image sensor, and the like. Some image capturing devices directly output analog video signals while others perform analog-digital conversion processing and output digital data, such as low voltage differential signaling (LVDS). In addition, the image capturing device 102 in the embodiment allows output of image data of two different gains by amplifying each of the electric signals obtained by a single exposure with two types of gains.

Here, a circuit configuration of the image capturing device 102 used in the embodiment is illustrated in FIG. 2.

A timing pulse control unit 201 controls the operation of the image capturing device 102 by supplying an operation clock signal CLK for each block of the image capturing device 102 and by supplying a timing signal to each block.

A vertical scanning circuit 202 performs timing control for sequentially reading out, in one frame, voltages represented by pixel signals accumulated by a pixel unit 203. Generally, video signals are sequentially read out line by line from a top line to a bottom line in one frame.

The pixel unit 203 includes a plurality of photoelectric conversion devices arranged in a matrix. Each of the photoelectric conversion devices generates an electrical signal corresponding to an amount of incident light and outputs the electric signal. In the present embodiment, the pixel unit 203 converts captured light into charge and accumulates the charge in capacitor floating diffusions (FDs). A capacitance of an FD can be changed between large and small, and signal noise is improved by changing the capacitance according to ISO sensitivity. Basically, the FD is used with the capacitance being set to large for a low ISO sensitivity and to small for a high ISO sensitivity. When images of two different gains are outputted, which will be described later, the capacitance for accumulating charge is common to the two gains. In addition, the capacitance is not limited to two types, large and small, and a setting of three or more levels may be possible.

A column amplifier 204 is used for electrically amplifying signals read out from the pixel unit 203. By amplifying the signals in the column amplifier 204, signal levels of pixels are amplified with respect to the noise to be outputted by a subsequent column ADC 205, thereby equally improving signal noise. Further, a structure is such that a gain of the column amplifier 204 can be changed by the timing pulse control unit 201. The image capturing device 102 includes two input memories in the column amplifier unit 204 for generating a high dynamic range (HDR) image and can output two types of gains by changing the gain of the column amplifier. By including two input memories, it is possible to apply two gains to signals of a certain time, read out from the FDs, and output the signals, and so, although the amount of data is increased, it is possible to obtain simultaneous images with two different gains. Although it is assumed that the present invention has two types of output of the image capturing device 102 of the embodiment, there is no particular limitation on the number of types of simultaneous output.

The column ADC 205 converts signals from the column amplifier 204 from analog to digital. Then, the column ADC 205 supplies digitalized signals (digital image data) to a horizontal transfer circuit 206. Horizontal transfer circuit 206 outputs line-by-line digital image data to the signal processing circuit 207. The signal processing circuit 207 is a circuit for digitally performing signal processing and can add an offset value of a certain amount in digital processing as well as easily perform gain calculation by performing shift calculation and multiplication. The signal processing circuit 207 passes the processed image data to an external output circuit 208. The external output circuit 208 supplies the image data as image data to an external device (image acquiring unit 193).

The description of the configuration of FIG. 1 is returned to. The image acquiring unit 103 captures image data outputted from the image capturing device 102. When the image capturing device 102 does not perform AD conversion and outputs analog signals, the above-described analog-to-digital conversion is performed in the image acquiring unit 103.

The image compositing unit 104 composites image data (image data with two types of gains) for generating an HDR image, outputted from the image capturing device 102, into an HDR image by using a predetermined compositing method. An example is a compositing method in which a high gain image (hereinafter, referred to as an H image) is used for a dark portion, a low gain image (hereinafter, referred to as an L image) is used for a bright portion, and a usage ratio of each image for weighted addition of the H image and the L image is determined for an intermediate region between, for example, a dark portion and a bright portion. In the present embodiment, a compositing algorithm is not limited so long as it is a technique for compositing two image of different gains.

The image compositing unit 104 generates compositing ratio information allowing a compositing ratio between the H image and the L image for each pixel at the time of compositing processing to be identified and attaches the generated compositing ratio information to a composite image. In the present embodiment, a compositing ratio is generated for each pixel; however, information may be information holding compositing information of only a mixed region, and the compositing information is not limited so long as the compositing ratio can be determined.

The signal processing unit 105 performs a pixel addition function as a typical image processing function of the image capturing apparatus and performs various kinds of image processing, such as noise reduction, gamma correction, knee correction, digital gain, defect correction, and the like. The image acquiring unit 103 and the signal processing unit 105 also include a storage circuit for storing setting values necessary for respective corrections and image processing, not explicitly illustrated in the block diagram.

A signal storage unit 106 stores an HDR composite image and video signals received from the image compositing unit 104 and the signal processing unit 105 in a storage medium (not illustrated). The storage medium may be a storage apparatus, such as an HDD; a non-volatile memory card, such as an SD card; or the like, and a type thereof does not matter.

The exposure control unit 107 can calculate an exposure amount from video signal information received from the image acquiring unit 103. The exposure control unit 107 in the present embodiment acquires the exposure amount with a method of calculating the exposure amount from the video signal information but may acquire the exposure amount from a control exposure at the time of image capturing. The exposure control unit 107 determines the operation of the image capturing device control unit 108 based on information related to the calculated exposure amount and transmits a parameter thereof to the image capturing device control unit 108.

Next, the operation of the image capturing device and the image compositing unit 104 at the time of HDR image generation will be described.

Figure 3:
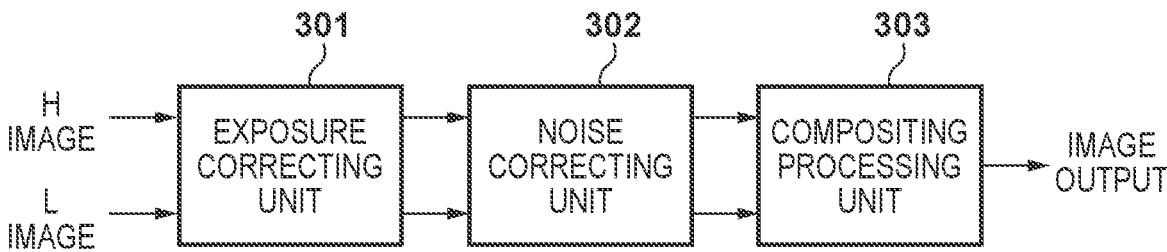
FIG. 3 is a block diagram of an image compositing unit in a first embodiment.

FIG. 3 is a block diagram of the image compositing unit 104 and illustrates a configuration until compositing processing in which the H image and the L image for which two types of gains have been applied, outputted from the image acquiring unit 103, are used. The processing equivalent to the illustration may be implemented by hardware or by a processor executing a control program.

An exposure correcting unit 301 causes the gains of the inputted H image and L image to be the same. This is to cause output for an input signal to be linear after the images have been composited into a single image. FIGS. 4A to 4C are graphs in which an amount of input light of the H image and an amount of input light of the L image are on a horizontal axis, and an output code after AD conversion is on a vertical axis. Candela (cd) is mainly used for units of the amount of light of the horizontal axis.

FIG. 4A illustrates a graph of the H image (bold line) and the L image (fine line). In this state, the brightnesses of the two images are different, and the images cannot be composited as they are.

Therefore, as illustrated in FIG. 4B, the exposure correcting unit 301 applies a gain to the L image for the brightnesses of the H image and the L image to match. FIG. 4C is an example in which the brightness of the L image has been adjusted to that of the H image. An exposure-corrected image for which the brightness has been adjusted to that of the H image by exposure correction on the L image is hereinafter referred to as a low gain 2 image (hereinafter referred to as an L2 image). A gain for obtaining the L2 image from the L image depends on the exposure difference between the H image and the L image. The exposure difference depends on exposure parameters (such as a shutter speed and an aperture) at the time of image capturing for obtaining an HDR composite image.

FIG. 5 illustrates an example of table information (assumed to be stored in the ROM in the control unit 150) in which a relationship between the exposure difference and a shift amount of the correction is defined. The exposure difference in the illustrated table uses the H image as a reference and indicates a difference in exposure of the L image from that of the H image. As illustrated in the drawing, the larger the exposure difference, the larger the shift amount of the correction. The exposure correcting unit 301 generates the L2 image by correcting the L image based on a shift amount determined by referring to the table such that the exposure is the same as that of the H image. For example, when the exposure difference between the H image and the L image at the time of image capturing by the image capturing device 102 is "−3 EV", the exposure correcting unit 301 generates the L2 image by performing exposure correction according to a gain shift amount of "+4 levels" for the L image.

It should be noted that at the time of L2 image generation, when the exposure difference between the H image and the L image is large, the gain correction amount will also be large, and simultaneously, the amount of noise will increase. When the amount of noise increases, the image quality of the generated HDR images naturally deteriorates.

Therefore, in the present embodiment, when the exposure difference is a preset threshold or more or when the gain shift amount is a threshold or more, a noise correcting unit 302 performs correction for noise reduction on the L2 image. For example, the noise correcting unit 302 performs filter processing in which an average value (or a weighted average value) of a pixel of interest to be corrected (one of R, G, and B pixels of a Bayer array) in the L2 image and four pixels closest to the pixel of interest and of the same color is used as a corrected pixel value of the pixel of interest. Consequently, when a luminance value of the pixel of interest is extremely high (or low) with respect to its surrounding due to a lot of noise being superimposed on the pixel of interest, a value thereof can be made a natural value, thereby realizing noise reduction. A size of a filter may be appropriately set or may be selected by the user.

Now, the compositing processing unit 303 generates HDR image data by performing compositing processing using the H image and the L2 image received via the noise correcting unit 302 and outputs the HDR image data.

Here, detailed processing of the compositing processing unit 303 will be described below.

First, a value of a pixel at coordinates (x, y) of the HDR image to be outputted is expressed as $P_{HDR}(x, y)$, a value of a pixel at coordinates (x, y) of the H image is expressed as $P_H(x, y)$, and a value of a pixel at coordinates (x, y) of the L2 image is expressed as $P_{L2}(x, y)$.

A threshold for determining a highlight region is defined as T_H, and a threshold for determining a dark region is defined as T_L.

When a value of a pixel is larger than the threshold T_H, that pixel is determined to be a pixel of the highlight region. When a value of a pixel is smaller than the threshold T_L, that pixel is determined to be a pixel of the dark region. When a value of a pixel is the threshold T_L or more and the threshold T_H or less, that pixel is determined to be that of the intermediate region.

The compositing processing unit 303 determines a value of each pixel of the HDR image according to the following.

When $P_H(x, y)$ is in the highlight region $$P_{HDR}(x,y)=P_{L2}(x,y)(\text{or } 0{\times}P_H(x,y)+1{\times}P_{L2}(x,y))$$

When $P_H(x, y)$ is in the intermediate region $$P_{HDR}(x,y)=0.5{\times}P_H(x,y)+0.5{\times}P_{L2}(x,y)$$

When $P_H(x, y)$ is in the dark region $$P_{HDR}(x,y)=P_H(x,y)(\text{or } 1{\times}P_H(x,y)+0{\times}P_{L2}(x,y))$$

In the present embodiment, a method is such that brightness adjustment and noise correction are performed and compositing is performed; however, when the processing order is reversed, similar processing is possible by using for a noise correction amount a correction amount in which a gain of brightness adjustment is considered, and so, the order is not limited.

Second Embodiment

A second embodiment will be described. In the second embodiment, a case in which a photographer acquires two images in a single instance of image capturing by using the image capturing device 102 capable of outputting a plurality of images on which different gains have been applied and composites the images will be described. A configuration in the second embodiment is the same as the configuration of the first embodiment illustrated in FIG. 1.

Figure 6:
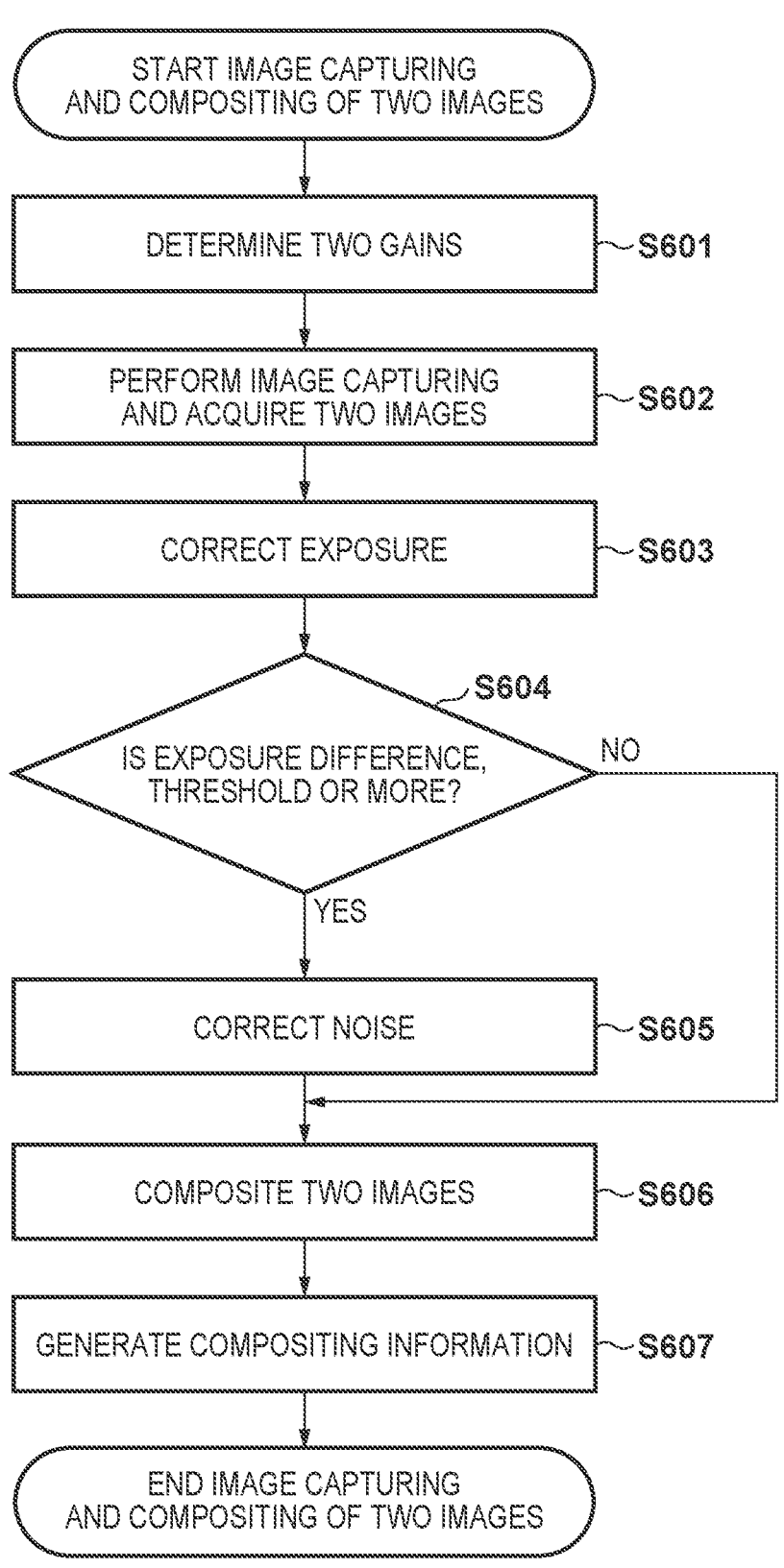
FIG. 6 is a flowchart for explaining processing for generating a composite image in a second embodiment.

In the following, the processing of the control unit 150 will be described with reference to a flowchart of FIG. 6. Assume that the processing illustrated in FIG. 6 is executed when the user selects an HDR compositing mode by operating the UI 160 and presses a shutter button.

In step S601, the control unit 150 determines an ISO sensitivity of the H image and the L image at the time of image capturing in the image capturing device 102, based on the current image capturing parameters. A method of determining the ISO sensitivity may be such that the ISO sensitivity is set manually by the photographer or determined automatically by the camera. In the present embodiment, a method is such that a gain is set according to the ISO sensitivity; however, the gain may be set according to exposure time. Next, in step S602, the control unit 150 causes the image capturing device control unit 108 to perform image capturing and generate two images (the H image and the L image) with different gains by controlling the image capturing device control unit 108.

Next, in step S603, the control unit 150 obtains a gain shift amount from an ISO sensitivity difference (exposure difference) between the H image and the L image. The control unit 150 controls the exposure correcting unit 301 to apply the obtained gain shift amount to the L image and generate the L2 image in which the brightness has been matched to that of the H image.

Next, in step S604, the control unit 150 determines whether the gain shift amount based on the exposure difference acquired in step S603 is a threshold (such as two levels) or more. When it is determined that the gain shift amount based on the exposure difference acquired in step S603 is the threshold (such as two levels) or more, the control unit 150 advances the processing to step S605, and when it is determined that the amount is less than the threshold, the control unit 150 advances the processing to step S606.

In step S605, the control unit 150 controls the noise correcting unit 302 to execute noise correction processing on the L2 image.

In step S606, the control unit 150 controls the compositing processing unit 303 to composite the H image and the L2 image (when the processing has gone through step S605, the L2 image on which noise correction processing has been performed) and generate an HDR composite image. Then, in step S606, the control unit 150 generates compositing information and adds it to the HDR image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088874, filed May 31, 2022, which is hereby incorporated by reference herein in its entirety.

What is claimed is:

1. An image processing apparatus operable to process first image data and second image data obtained from an image capturing device that is capable of amplifying, with a first gain and a second gain being lower than the first gain, a signal obtained by photoelectric conversion to obtain the first image data and second image data, respectively, the apparatus comprising:

at least one memory configured to store instructions; and
at least one processor coupled to the at least one memory and configured to execute the instructions to:
(1) apply a gain to the second image data so that brightness of the second image data matches brightness of the first image data;
(2) apply a noise reduction process to the second image data of which the brightness has been corrected; and
(3) generate composite image data by compositing (a) the second image data having had applied thereto the noise reduction process and (b) the first image data.

2. The apparatus according to claim 1, wherein the at least one processor is further configured to execute the instructions to:

apply to the second image data, as the noise reduction process, a filter processing that averages a value of a pixel of interest with values of other pixels nearby the pixel of interest.

3. The apparatus according to claim 1, wherein the at least one processor is further configured to execute the instructions to:

(1) determine whether to apply the noise reduction process in accordance with an exposure difference between the first image data and the second image data, the exposure difference being based on exposure parameters or a control exposure used to obtain the signal; and
(2) only apply the noise reduction process to the second image data of which the brightness has been corrected in a case where it is determined that the noise reduction process is to be applied.

4. The apparatus according to claim 3, wherein the at least one processor is further configured to execute the instructions to acquire the exposure difference by referencing a predetermined table based on the exposure parameters,

wherein the amount of the gain applied to the second image data is determined based on the exposure difference.

5. The apparatus according to claim 1, wherein the at least one processor is further configured to execute the instructions to generate high dynamic range (HDR) image data.

6. The apparatus according to claim 5, wherein the the at least one processor is further configured to execute the instructions to generate information indicating a compositing ratio of each pixel in two image data used when generating the HDR image data.

7. The apparatus according to claim 1, wherein the image capturing device is included.

8. A control method of an image processing apparatus operable to process first image data and second image data obtained from an image capturing unit capable of amplifying, with a first gain and a second gain being lower than the first gain, a signal obtained by photoelectric conversion to obtain the first image data and the second image data, respectively, the method comprising:

applying a gain to the second image data so that brightness of the second image data matches brightness of the first image data;
applying a noise reduction process to the second image data of which the brightness has been corrected; and
generating composite image data by compositing (a) the second image data having had applied thereto the noise reduction process and (b) the first image data.

9. A non-transitory computer-readable storage medium storing instructions which, when read and executed by a computer, causes the computer to execute steps of a method of controlling an image processing apparatus operable to process first image data and second image data obtained from an image capturing unit capable of amplifying, with a first gain and a second gain being lower than the first gain, a signal obtained by photoelectric conversion to obtain the first image data and the second image data, respectively, the method comprising:

applying a gain to the second image data so that brightness of the second image data matches brightness of the first image data;
applying a noise reduction process to the second image data of which the brightness has been corrected; and
generating composite image data by compositing (a) the second image having had applied thereto the noise reduction process and (b) the first image data.

* * * * *